United States Patent
Kim et al.

(10) Patent No.: US 8,787,277 B2
(45) Date of Patent: Jul. 22, 2014

(54) METHOD AND APPARATUS FOR TRANSMITTING UPLINK CONTROL INFORMATION

(75) Inventors: Hak Seong Kim, Anyang-si (KR); Byoung Hoon Kim, Anyang-si (KR); Han Byul Seo, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 13/148,389

(22) PCT Filed: Feb. 9, 2010

(86) PCT No.: PCT/KR2010/000777
§ 371 (c)(1),
(2), (4) Date: Aug. 8, 2011

(87) PCT Pub. No.: WO2010/090492
PCT Pub. Date: Aug. 12, 2010

(65) Prior Publication Data
US 2011/0310821 A1 Dec. 22, 2011

Related U.S. Application Data

(60) Provisional application No. 61/151,145, filed on Feb. 9, 2009, provisional application No. 61/155,098, filed on Feb. 24, 2009, provisional application No. 61/158,390, filed on Mar. 8, 2009, provisional application No. 61/166,767, filed on Apr. 5, 2009.

(30) Foreign Application Priority Data

Feb. 9, 2010 (KR) .......... 10-2010-0011745

(51) Int. Cl.
*H04W 72/04* (2009.01)
*H04B 7/155* (2006.01)
*H04W 4/00* (2009.01)

(52) U.S. Cl.
CPC .......... *H04B 7/15542* (2013.01); *H04W 72/04* (2013.01); *H04W 4/00* (2013.01)
USPC .......................................... 370/329; 370/338

(58) Field of Classification Search
CPC ........................................... H04W 72/04
USPC .................................. 370/329, 338
See application file for complete search history.

(56) References Cited

U.S. PATENT DOCUMENTS

| 4,742,512 A * | 5/1988 | Akashi et al. ............. 370/347 |
| 2005/0048920 A1 | 3/2005 | Liu |
| 2008/0209301 A1 | 8/2008 | Chang et al. |
| 2008/0219229 A1 * | 9/2008 | Zheng ...................... 370/338 |
| 2009/0092066 A1 * | 4/2009 | Chindapol et al. ......... 370/277 |
| 2009/0175333 A1 * | 7/2009 | Hsiang ................. 375/240.12 |
| 2009/0185531 A1 | 7/2009 | Chun et al. |

FOREIGN PATENT DOCUMENTS

| KR | 10-2008-0079567 A | 9/2008 |
| KR | 10-2006-0115819 A | 11/2008 |

OTHER PUBLICATIONS

3GPP TS 36.321 V8.4.0; 3rd Generation Partnership Project; Technical Specification Group Radio Access Network; Evolved Universal Terrestrial Radio Access (E-UTRA) Medium Access Control (MAC) Protocol Specification (Release 8); Dec. 2008.

* cited by examiner

*Primary Examiner* — Wei Zhao
(74) *Attorney, Agent, or Firm* — Birch, Stewart, Kolasch & Birch, LLP

(57) ABSTRACT

A method of transmitting uplink control information of a user equipment in a wireless communication system is provided. The method includes: receiving reserved resource information that indicates a radio resource capable of transmitting the uplink control information; receiving a block subframe indicator that indicates a radio resource for transmitting a signal from a relay station to a base station; comparing a transmission-reserved subframe indicated by the reserved resource information with a block subframe indicated by the block subframe indicator; and transmitting the uplink control information in the transmission-reserved subframe if the transmission-reserved subframe does not overlap with the block subframe.

12 Claims, 15 Drawing Sheets

METHOD AND APPARATUS FOR TRANSMITTING UPLINK CONTROL INFORMATION

CROSS REFERENCE TO RELATED APPLICATIONS

This application is the National Phase of PCT/KR2010/000777 filed on Feb. 9, 2010, which claims the benefit under 35 U.S.C. 119(e) of U.S. Provisional Application Nos. 61/151,145; 61/155,098; 61/158,390 and 61/166,767 filed on Feb. 9, 2009; Feb. 24, 2009; Mar. 8, 2009 and Apr. 5, 2009; respectively. All of which are hereby expressly incorporated by reference into the present application.

TECHNICAL FIELD

The present invention relates to wireless communications, and more particularly, to a method and apparatus for transmitting uplink control information in a wireless communication system employing a relay station.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) prepares a system standard satisfying requirements of the IMT-advanced, that is LTE-advanced, which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A relay station technology is one of main technologies for the LTE-advanced.

A relay station (RS) is a device for relaying a signal between a base station (BS) and a user equipment (UE), and is used for cell coverage extension and throughput enhancement of a wireless communication system.

In the wireless communication system employing the RS, a frequency band at which the RS transmits a signal to the BS may be equal to a frequency band at which a UE (e.g., a relay UE) connected to the RS transmits a signal to the RS. In this case, if a time duration in which the RS transmits a signal to the BS coincides with a time duration in which the relay UE transmits a signal to the RS, it is difficult for the RS to receive a signal from the relay UE due to self interference.

Uplink control information can be included in a signal transmitted by the relay UE. Examples of the uplink control information include a scheduling request (SR), a hybrid automatic repeat request (HARQ) acknowledgement (ACK)/non-acknowledgement (NACK) for previously performed downlink transmission, channel information that is fed back for previously performed downlink transmission, a reference signal for scheduling uplink transmission, etc. The uplink control information is transmitted either periodically or aperiodically, and can be transmitted by using a time, radio resource, and transmission format indicated by a higher layer signal.

However, when the time duration in which the RS transmits the signal to the BS overlaps with the time duration in which the relay UE transmits the signal to the RS as described above, the RS is unable to receive the uplink control information, and as a result, the BS is unable to know the uplink control information transmitted by the UE. As a result, the wireless communication system employing the RS may experience performance deterioration.

SUMMARY OF INVENTION

Technical Problem

The present invention provides a method and apparatus capable of transmitting uplink control information in a reliable manner by considering a case where a time duration in which a relay station transmits a signal to a base station overlaps with a time duration in which a relay user equipment transmits a signal to the relay station.

Technical Solution

According to an aspect of the present invention, a method for transmitting uplink control information of a user equipment in a wireless communication system is provided. The method includes: receiving reserved resource information that indicates a radio resource capable of transmitting the uplink control information; receiving a block subframe indicator that indicates a radio resource for transmitting a signal from a relay station to a base station; comparing a transmission-reserved subframe indicated by the reserved resource information with a block subframe indicated by the block subframe indicator; and transmitting the uplink control information in the transmission-reserved subframe if the transmission-reserved subframe does not overlap with the block subframe.

According to another aspect of the present invention, there is provided an apparatus including: a radio frequency (RF) unit for transmitting and receiving a radio signal; and a processor coupled to the RF unit, wherein the processor receives reserved resource information that indicates a radio resource capable of transmitting the uplink control information, receives a block subframe indicator that indicates a radio resource for transmitting a signal from a relay station to a base station to compare a transmission-reserved subframe indicated by the reserved resource information with a block subframe indicated by the block subframe indicator, and transmits the uplink control information in the transmission-reserved subframe if the transmission-reserved subframe does not overlap with the block subframe.

Advantageous Effects

According to the present invention, a user equipment can transmit uplink control information in a reliable manner in a wireless communication system employing a relay station.

MODE FOR INVENTION

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiplex access (SC-FDMA) in an uplink. LTE-advanced (LTE-A) is an evolution of the 3GPP LTE. For clarity, the following description will focus on the 3GPP LTE/LTE-A. However, technical features of the present invention are not limited thereto.

Figure 1:
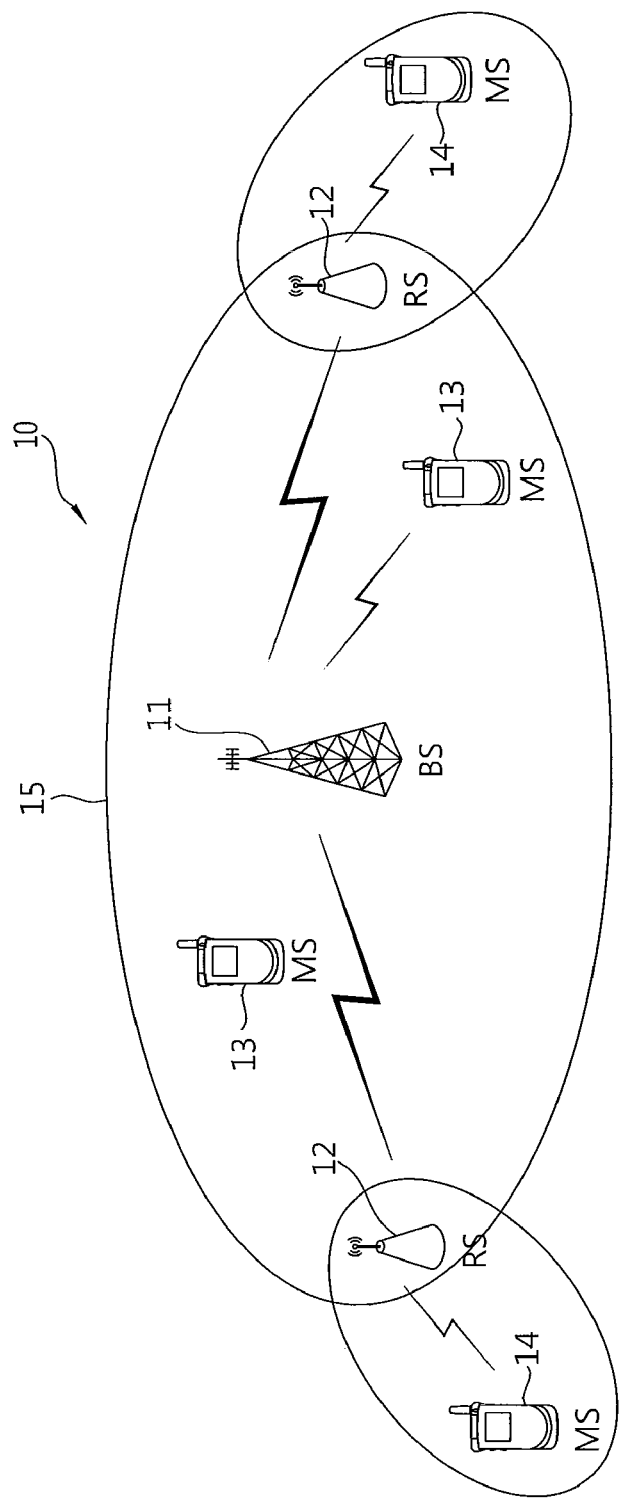
FIG. 1 shows a wireless communication system employing a relay station.

FIG. 1 shows a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma UE) 13 denotes a UE that directly communicates with the BS 11, and a relay UE (or Re UE) 14 denotes a UE that communicates with the RS. Even if the Ma UE 13 exists in a cell of the BS 11, the Ma UE 13 can communicate with the BS 11 via the RS 12 to improve a data transfer rate depending on a diversity effect.

Hereinafter, a downlink (DL) denotes communication from the BS 11 to the Ma UE 13, and an uplink (UL) denotes communication from the Ma UE 13 to the BS 11. A backhaul link denotes a link between the BS 11 and the RS 12. A backhaul DL denotes communication from the BS 11 to the RS 12. A backhaul UL denotes communication from the RS 12 to the BS 11. An access link denotes a link between the RS 12 and the Re UE 14. An access DL denotes communication from the RS 12 to the Re UE 14. An access UL denotes communication from the Re UE 14 to the RS 12.

The wireless communication system 10 employing the RS is a system supporting bidirectional communication. The bidirectional communication may be performed by using a time division duplex (TDD) mode, a frequency division duplex (FDD) mode, etc. When in the TDD mode, UL transmission and DL transmission use different time resources. Likewise, in backhaul link transmission and access link transmission, UL transmission and DL transmission use different time resources. When in the FDD mode, UL transmission and DL transmission use different frequency resources. Likewise, in backhaul link transmission and access link transmission, UL transmission and DL transmission use different frequency resources.

Figure 2:
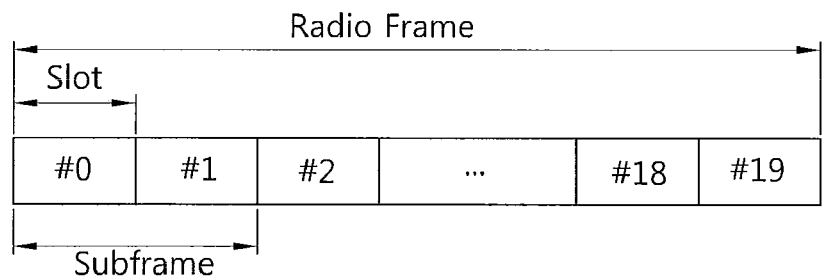
FIG. 2 shows a radio frame structure.

FIG. 2 shows a radio frame structure.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 3:
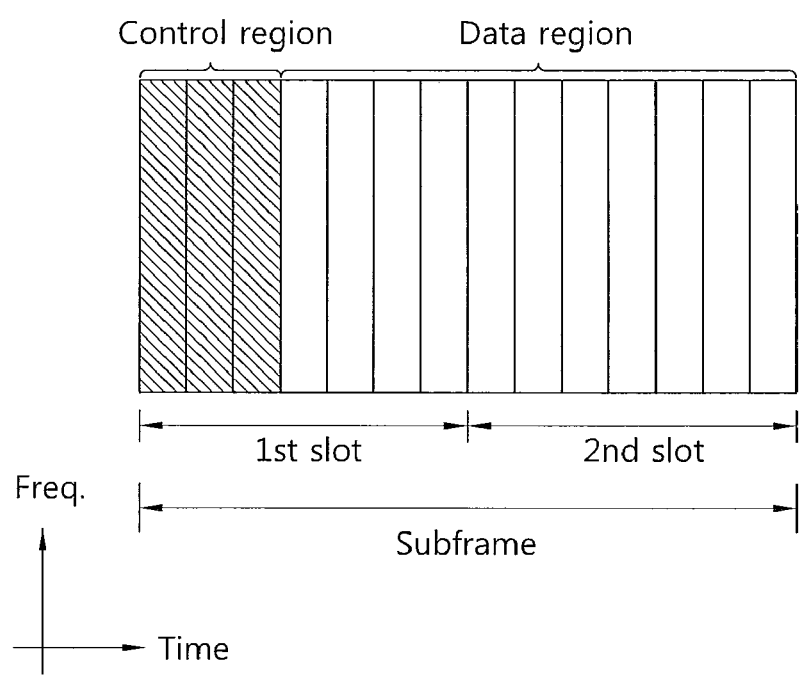
FIG. 3 shows a structure of a downlink subframe in $3^{rd}$ generation partnership project (3GPP) long term evolution (LTE).

FIG. 3 shows a structure of a DL subframe in 3GPP LTE. The subframe includes two consecutive slots. A maximum of three OFDM symbols located in a front portion of a $1^{st}$ slot in the DL subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the PDSCH by decoding control information transmitted through the PDCCH. Although the control region includes three OFDM symbols herein, this is for exemplary purposes only. The PDCCH carries a DL grant that reports resource allocation of DL transmission on the PDSCH. More specifically, the PDCCH can carry a downlink shared channel (DL-SCH)'s resource allocation and transmission format, paging information regarding a paging channel (PCH), system information regarding the DL-SCH, a resource allocation of a higher-layer control message such as a random access response transmitted on the PDSCH, transmission power control command, activation of a voice over Internet (VoIP), etc. In addition, the PDCCH transmits a UL grant that reports resource allocation of UL transmission to the UE. The number of OFDM symbols included in the control region of the subframe can be known by using the PCFICH. The PRICE carries a hybrid automatic repeat request (HARQ) acknowledgement (ACK)/negative-acknowledgment (NACK) signal in response to the UL transmission.

Figure 4:
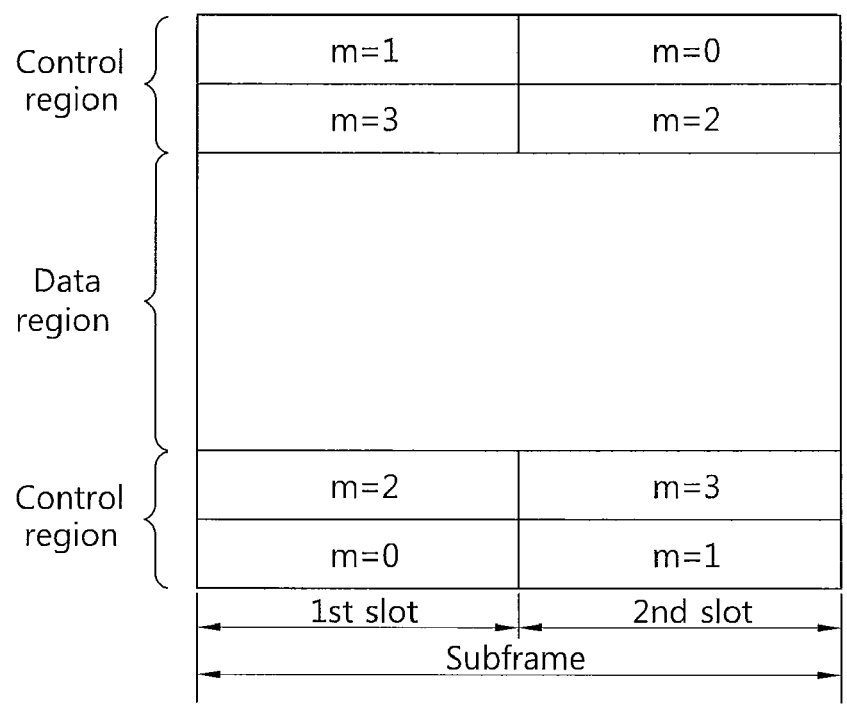
FIG. 4 shows an example of an uplink subframe structure in 3GPP LTE.

FIG. 4 shows an example of a UL subframe structure in 3GPP LTE.

Referring to FIG. 4, the UL subframe may be divided into a control region to which a physical uplink control channel (PUCCH) carrying UL control information is allocated and a data region to which a physical uplink shared channel (PUSCH) carrying user data is allocated. A middle part of the subframe is allocated to the PUSCH. Both end parts of the data region are allocated to the PUCCH. To maintain a single-carrier property in SC-FDMA, consecutive resource blocks in a frequency domain are allocated to a single UE. The single UE cannot simultaneously transmit the PUCCH and the PUSCH.

The PUSCH is mapped to an uplink shared channel (UL-SCH) that is a transport channel. Examples of UL control information transmitted through the PUCCH include a scheduling request (SR) which is a UL radio resource allocation request, an ACK/NACK used for performing HARQ, and CQI/PMI/RI which are channel information fed back for previously performed DL transmission. A sounding reference signal (SRS) which is a reference signal for scheduling UL transmission is transmitted through the PUSCH.

The PUCCH for the single UE is allocated to a resource block pair in a subframe. Resource blocks belonging to the resource block pair occupy different subcarriers in each of the two slots. In this case, it is said that the resource block pair assigned to the PUCCH is frequency hopped in a slot boundary. Herein, a PUCCH (m=0), a PUCCH (m=1), a PUCCH (m=2), and a PUCCH (m=3) are allocated to the subframe, which is for exemplary purposes only.

Hereinafter, the UL control information collectively refers to control information other than UL data, such as an SR, an ACK/NACK, channel information to be fed back, an SRS, etc.

Figure 5:
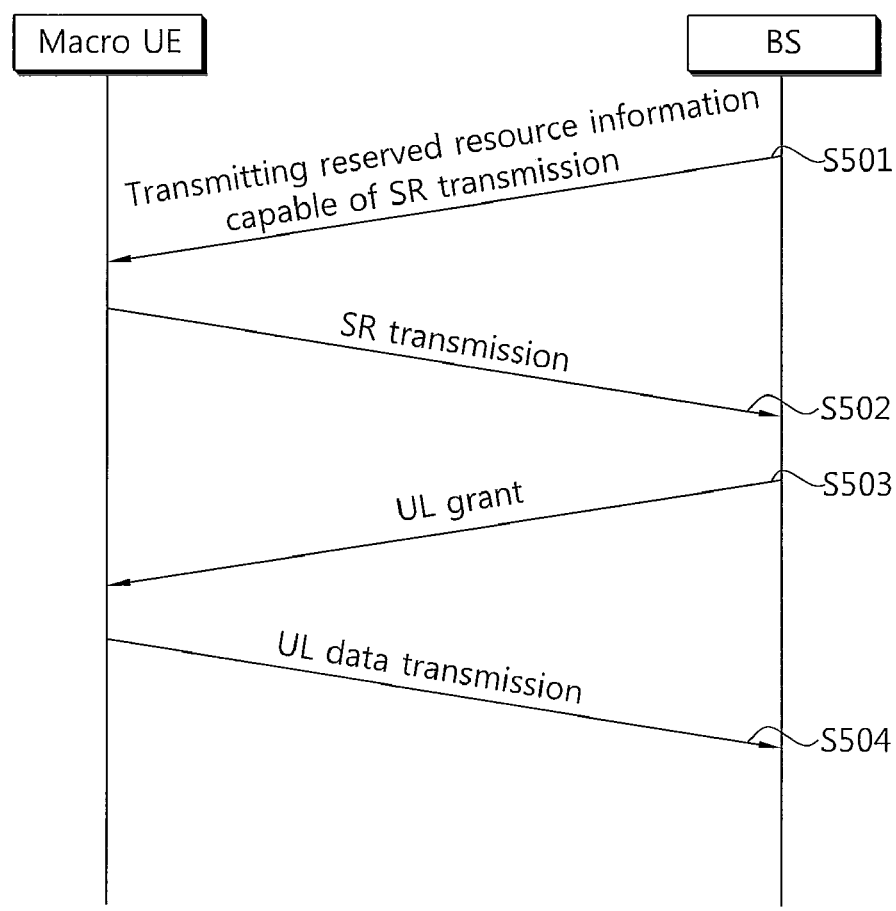
FIG. 5 shows an example of transmitting uplink control information between a base station and a macro user equipment.

FIG. 5 shows an example of transmitting UL control information between a BS and a macro UE. In FIG. 5, a scheduling request (SR) is used as UL control information transmitted from the macro UE.

The BS transmits reserved resource information capable of SR transmission to the macro UE by using a higher layer signal (step S501). The reserved resource information refers to information for a radio resource that is reserved to transmit the UL control information. Detailed contents included in the reserved resource information may vary depending on a type of the UL control information.

For example, a radio resource capable of transmitting the SR is described as follows in the section 10.1 of 3GPP TS 36.213 V.8.5.0 "Evolved Universal Terrestrial Radio Access (E-UTRA) Physical layer procedure (Release 8)".

The SR is transmitted in a PUCCH resource $n^{(1)}_{PUCCH} = n^{(1)}_{PUCCH,SRI}$. The $n^{(1)}_{PUCCH,SRI}$ is a UE-specific resource and is configured in a higher layer. An SR configuration for an SR transmission periodicity and an SR subframe offset is defined by an SR configuration index $I_{SR}$. The SR transmission periodicity can selected from {5 ms, 10 ms, 20 ms, 40 ms, 80 ms, OFF}. Herein, OFF indicates an infinite SR transmission periodicity. A subframe in which the SR is transmitted is a subframe that satisfies Equation 1 below.

$$(10 \times n_f + \lfloor n_s/2 \rfloor - N_{OFFSET,SR}) \bmod SR_{periodicity} = 0 \quad \text{[Equation 1]}$$

In Equation 1, $n_f$ denotes a system frame number, and $n_s = \{0, 1, \ldots, 19\}$ denotes a slot index within a radio frame. $N_{OFFSET,SR}$ denotes an SR subframe offset, and $SR_{periodicity}$ denotes an SR periodicity.

The SR configuration index, the SR transmission periodicity, and the SR subframe offset are shown in Table 1 below.

TABLE 1

| SR configuration Index $I_{SR}$ | SR periodicity (ms) | SR subframe offset |
| --- | --- | --- |
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155 | OFF | N/A |

That is, the BS transmits the reserved resource information capable of transmitting the SR to the macro UE by using a signal of a layer higher than a physical layer (hereinafter, referred to as a higher layer signal). The reserved resource information may be given in a format of the SR configuration index, or may be given in a format of the SR periodicity and SR subframe offset information. For example, if the SR configuration index $I_{SR}$ is set to 8 by the BS, the SR periodicity is 10 ms and the SR subframe offset is 3 ms.

The UE can transmit the SR by using a radio resource reserved on the basis of the reserved resource information (step S502). The process of transmitting the SR is described as shown in Table 2 below in the section 5.4.4. of 3GPP TS 36.321 V.8.4.0 "Evolved Universal Terrestrial Radio Access (E-UTRA) Medium Access Control (MAC) protocol specification (Release 8)".

TABLE 2

The Scheduling Request (SR) is used for requesting UL-SCH resources for new transmission.
When an SR is triggered, it shall be considered as pending until it is cancelled.
If an SR is triggered and there is no other SR pending, the UE shall set the SR_COUNTER to 0.
As long as one SR is pending, the UE shall for each TTI:
    if no UL-SCH resources are available for a transmission in this TTI:
        if the UE has no valid PUCCH resource for SR configured in any TTI: initiate a Random
        Access procedure (see subclause 5.1) and cancel all pending SRs;
        else if the UE has a valid PUCCH resource for SR configured for this TTI and if this TTI is
        not part of a measurement gap:
            if SR_COUNTER < dsr-TransMax:
                increment SR_COUNTER by 1;
                instruct the physical layer to signal the SR on PUCCH;
            else:
                notify RRC to release PUCCH/SRS;

TABLE 2-continued clear any configured downlink assignments and uplink grants;
initiate a Random Access procedure (see subclause 5.1) and cancel all pending SRs
else if UL-SCH resources are available for a new transmission in this TTI, cancel all pending
SR(s).

According to Table 2, if the SR is triggered and there is no other SR pending, the UE sets SR COUNTER to 0. If no PUSCH resource is available for transmitting the SR in each TTI and if there is no PUCCH resource, then a random access procedure is performed. If the PUCCH resource exists and if a value SR COUNTER is less than a value dsr-TransMax, then the value SR COUNTER is incremented by 1, and the SR is transmitted by using the PUCCH resource. Herein, dsr_TransMax denotes a maximum repetition count of SR transmission. dsr_TransMax may have any one of values {4, 8, 16, 32, 64, spare1, spare2, spare3}. Herein, the spare1 through the spare3 are reserved values. On the other hand, if the value SR COUNTER is greater than or equal to the value dsr-TransMax, it is notified to the RRC that PUCCH/SRS is released, and a random access procedure is performed and all pending SRs are cancelled. If the PUSCH resource exists, all SRs are cancelled.

The UE receives a UL grant from the BS (step S503). The UL grant is UL resource allocation information transmitted from the BS. In general, the UE transmits UL data through the PUSCH by using the UL grant. The UL data may be a transport block which is a data block for a UL-SCH transmitted during a TTI. The UE transmits the UL data (step S504). The UL data can be transmitted through the PUSCH.

Although the SR is exemplified above as the UL control information, the UL control information may include channel information to be fed back. Examples thereof include a channel quality indicator (CQI), a precoding matrix indicator (PMI), a rank indicator (RI), etc.

The CQI provides information on a link adaptive parameter that can be supported by the UE for a given time. Any one of the following compression schemes can be used in CQI transmission.

1. Wideband feedback: Wideband feedback is a scheme in which one CQI value is fed back for a full system band.
2. UE-specific sub-band feedback: UE-specific sub-band feedback is a scheme in which a UE estimates channel quality of each sub-band and thereafter selects a plurality of sub-bands having good quality. In addition, an average CQI value is fed back for the plurality of selected sub-bands.
3. Higher-layer configured sub-band feedback: Higher-layer configured sub-band feedback is a scheme in which an individual CQI is fed back for each sub-band configured in a higher layer.

The PMI provides information for a precoding matrix in codebook-based precoding. The PMI is in association with multiple input multiple output (MIMO). When the PMI is fed back in MIMO, it is called closed-loop MIMO. A DL transmission mode can be classified into 7 modes as follows. Among them, PMI feedback is used only in DL transmission modes 4, 5, and 6.

1. Single-antenna port: This is a mode in which precoding is not performed.
2. Transmit diversity: Transmit diversity can be used in 2 or 4 antenna ports using SFBC.
3. Open-loop spatial multiplexing: This is an open-loop mode in which rank adaptation based on RI feedback is possible. The transmit diversity is applicable when a rank is 1. A great delay CDD can be used when the rank is greater than 1.
4. Closed-loop spatial multiplexing: This is a mode in which precoding feedback supporting dynamic rank adaptation is applied.
5. Multi-user MIMO
6. Closed-loop rank-1 precoding
7. Single-antenna port: This is a mode that can be used for beamforming when a UE-specific reference signal is used.

The RI is information for the number of layers recommended by the UE. That is, the RI indicates the number of streams used in spatial multiplexing. The RI is fed back only when the UE is operated in a MIMO mode using spatial multiplexing. That is, the RI is fed back only in the DL transmission modes 3, and 4 among the aforementioned DL transmission modes. For example, the RI is not fed back in the single-antenna port mode or the transmit diversity mode. The RI may be 1 or 2 in a 2×2 antenna configuration, and may be any one of values 1 to 4 in a 4×4 antenna configuration. The RI is also in association with one or more CQI feedbacks. That is, a specific RI value is assumed in calculation of the CQI to be fed back. A rank of a channel changes slowly in general in comparison with the CQI, and thus the RI is fed back in a less number of times than the CQI. An RI transmission periodicity may be a multiple of a CQI/PMI transmission periodicity. The RI is given for a full system band, and a frequency selective RI feedback is not supported.

A method of transmitting the UL control information includes a periodic transmission method and an aperiodic transmission method. In the periodic transmission, the UL control information is transmitted through the PUCCH in general, but it may also be transmitted through the PUSCH. If the BS requires further detailed channel state information, the aperiodic transmission is performed by requesting the UE to transmit the information. The aperiodic transmission is performed through the PUSCH. Since the PUSCH is used, a channel state can be reported with a greater capacity and in a more detailed manner. When the periodic transmission and the aperiodic transmission collide with each other, only the aperiodic transmission is performed.

Regarding channel information to be fed back, such as the aforementioned CQI/PMI/RI, the BS first transmits the reserved resource information. The UE feeds back the channel information to the BS by using a radio resource selected from radio resources depending on the reserved resource information.

For example, a case where periodic transmission is performed and CQI/PMI is fed back in a wideband is assumed. In this case, the CQI/PMI to be subjected to wideband feedback can be fed back to the BS in a subframe that satisfies Equation 2 below.

$$(10 \times n_f + \lfloor n_s/2 \rfloor - N_{OFFSET,CQI}) \bmod N_P = 0 \qquad \text{[Equation 2]}$$

In Equation 2, $n_f$ denotes a system frame number, and $n_s = \{0, 1, \ldots, 19\}$ denotes a slot index within a radio frame. $N_{OFFSET,CQI}$ denotes a CQI/PMI subframe offset, and $N_p$ denotes a CQI/PMI periodicity.

If a time interval in which the RI is reported to the BS is denoted by $M_{RI}$, then $M_{RI}$ may be an integer multiple of $N_p$. $M_{RI}$ can be selected from {1, 2, 4, 8, 16, 32, OFF}. If $M_{RI}$ is not OFF, a subframe in which the RI is fed back is a subframe that satisfies Equation 3 below.

$$(10 \times n_f + \lfloor n_s/2 \rfloor - N_{OFFSET,CQI} - N_{OFFSET,RI}) \bmod (N_P \cdot M_{RI}) = 0 \quad \text{[Equation 3]}$$

In Equation 3, $n_f$ denotes a system frame number, and $n_s = \{0, 1, \ldots, 19\}$ denotes a slot index within a radio frame. $N_{OFFSET,CQI}$ denotes a CQI/PMI subframe offset, and $N_{OFFSET,RI}$ denotes a relative offset value for a CQI/PMI subframe offset. $N_{OFFSET,RI}$ can be selected from $\{1, -1, \ldots, -(N_p-1)\}$. The RI and the CQI/PMI to be fed back in a wideband are not reported to the BS in the same subframe. If the RI collides with the CQI/PMI to be fed back in a wideband, the CQI/PMI is not transmitted, that is, the CQI/PMI is dropped.

$N_P$ and $N_{OFFSET,CQI}$ can be determined by cqi-pmi-ConfigurationIndex. In case of the FDD mode, they can be determined according to Table 3 below. In case of the TDD, they can be determined according to Table 4 below.

TABLE 3

| cqi-pmi-ConfigurationIndex = $I_{CQI/PMI}$ | Value of $N_P$ | Value of $N_{OFFSET, CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | OFF | n/a |
| $318 \leq I_{CQI/PMI} \leq 511$ | | Reserved |

TABLE 4

| cqi-pmi-ConfigurationIndex = $I_{CQI/PMI}$ | Value of $N_P$ | Value of $N_{OFFSET, CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $I_{CQI/PMI} = 316$ | OFF | n/a |
| $317 \leq I_{CQI/PMI} \leq 511$ | | Reserved |

In addition, $M_{RI}$ and $N_{OFFSET,RI}$ can be determined by ri-ConfigurationIndex according to Table 5 below.

TABLE 5

| ri-ConfigurationIndex = $I_{RI}$ | Value of $M_{RI}$ | Value of $N_{OFFSET, RI}$ |
|---|---|---|
| $0 \leq I_{RI} \leq 160$ | 1 | $I_{RI}$ |
| $161 \leq I_{RI} \leq 321$ | 2 | $(I_{RI} - 161)$ |
| $322 \leq I_{RI} \leq 482$ | 4 | $(I_{RI} - 322)$ |
| $483 \leq I_{RI} \leq 643$ | 8 | $(I_{RI} - 483)$ |
| $644 \leq I_{RI} \leq 804$ | 16 | $(I_{RI} - 644)$ |
| $805 \leq I_{RI} \leq 965$ | 32 | $(I_{RI} - 805)$ |
| $I_{RI} = 966$ | OFF | n/a |
| $967 \leq I_{RI} \leq 1023$ | | Reserved | cqi-pmi-ConfigurationIndex and ri-ConfigurationIndex can be given by a higher layer signal. The section 7.2 of 3GPP TS 36.213 V8.5.0 (2008-12) can be incorporated in the aforementioned description.

That is, the UE receives reserved resource information from the BS. The reserved resource information (i.e., cqi-pmi-ConfigurationIndex, ri-ConfigurationIndex, a transmission periodicity and/or a subframe offset based on these indices, etc.) is information for a radio resource capable of transmitting channel information such as CQI/PMI/RI. Then, the UE transmits channel information by using a radio resource selected from radio resources depending on the reserved resource information.

A problem may arise when the conventional method of transmitting the UL control information is equally applied to the wireless communication system employing the RS. This is because there may be a case where the RS is unable to receive UL control information transmitted from the relay UE when the wireless communication system employs the RS.

Figure 6:
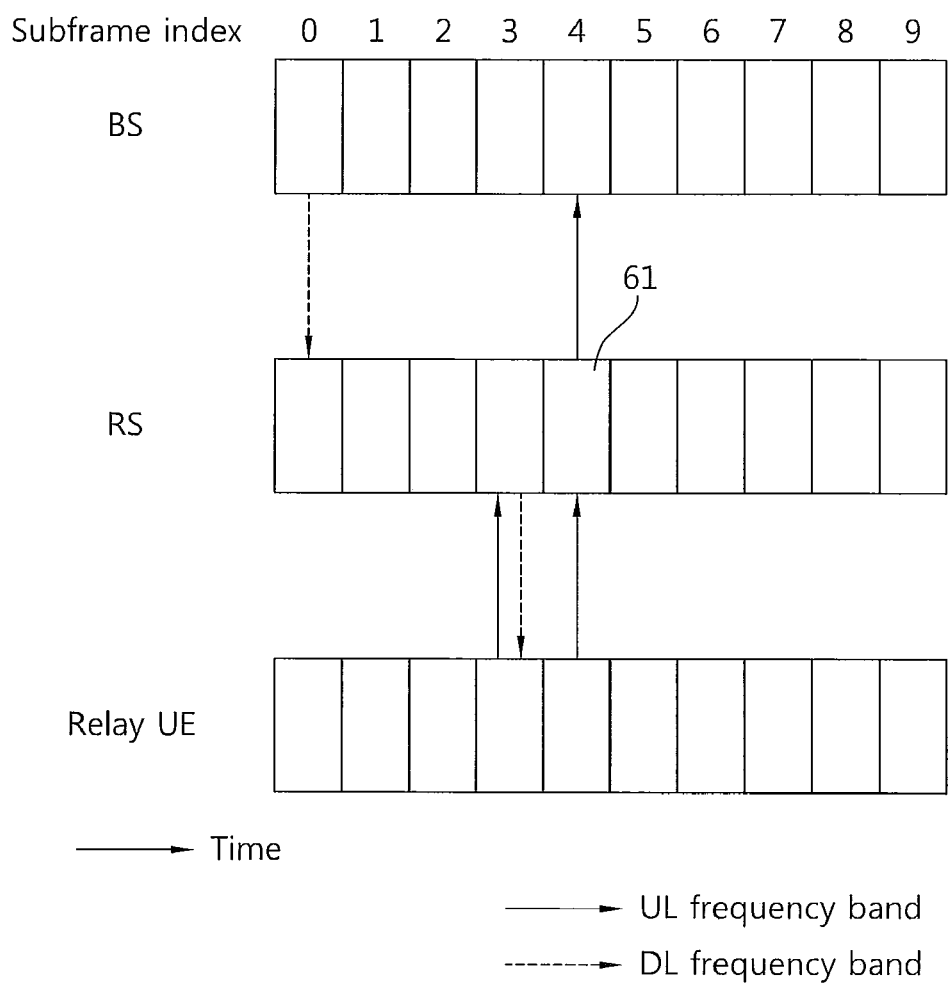
FIG. 6 shows a block subframe in which a relay station is unable to receive uplink control information in a wireless communication system employing the relay station.

FIG. 6 shows a block subframe in which an RS is unable to receive UL control information in a wireless communication system employing the RS.

Referring to FIG. 6, when the RS transmits a signal to a BS in a subframe #4 61, the signal cannot be received from a relay UE. Hereinafter, a subframe such as the subframe 61 is called a block subframe. The subframe can be regarded as a subframe in which the RS transmits a signal to the BS. In the block subframe 61, the RS is unable to receive UL control information transmitted from the relay UE. Therefore, the wireless communication system may experience performance deterioration, and thus there is a need for a method and apparatus for transmitting UL control information by considering the block subframe.

Figure 7:
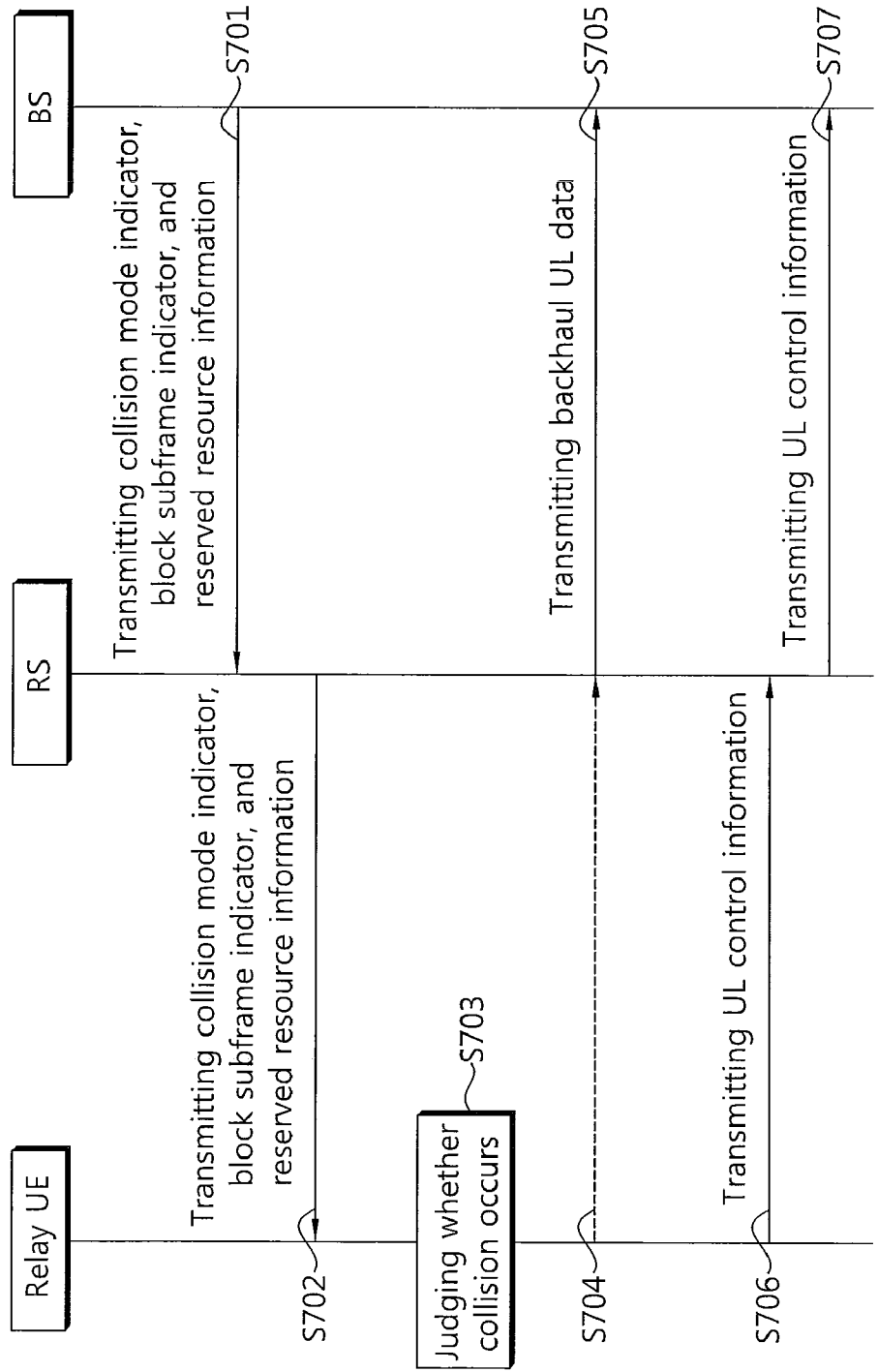
FIG. 7 is a flowchart showing a method of transmitting uplink control information according to an embodiment of the present invention.

FIG. 7 is a flowchart showing a method of transmitting UL control information according to an embodiment of the present invention.

Referring to FIG. 7, a BS transmits a collision mode indicator, a block subframe indicator, and reserved resource information to an RS (step S701). The RS transmits the collision mode indicator, the block subframe indicator, and the reserved resource information to a relay UE (step S702). It is assumed hereinafter that information on the block subframe is shared between the BS and the RS.

The collision mode indicator can indicate whether to allow collision between backhaul UL transmission and access UL transmission in the same subframe. The collision mode indicator can indicate any one of a collision enabled mode and a collision disabled mode. A scheduler of the BS or the RS performs scheduling while avoiding collision to the maximum extent possible, and if it is determined that occurrence of the collision is inevitable in practice, may indicate the collision enabled mode. For example, if the number of UEs in a cell is greater than a threshold, the collision enabled mode can be indicated. The collision mode indicator can be transmitted by using a higher layer signal. The collision mode indicator can change the mode depending on a time duration. However, for a simple system configuration, the system can be configured to operate only in any one of the two modes. Although the collision mode indicator is indicated by an additional signal in FIG. 7, the present invention is not limited thereto. The collision mode indicator can be transmitted by being included in other existing signal. For example, a method of indicating the collision enabled mode can be used when some bits of the existing signal such as reserved resource information are set differently. Alternatively, information indicating whether to allow collision can be delivered by combining the existing signals.

The block subframe indicator delivers information on the block subframe. For example, in case of an SR, by comparing an SR transmission periodicity and SR subframe offset included in the reserved resource information with a subframe configuration of a backhaul link, it is possible to report an index of a subframe in which a result obtained by an XOR operation performed between a subframe index at which the RS performs backhaul UL transmission to the BS and a subframe index at which the relay UE can transmit the SR to the RS becomes 0. The block subframe indicator can perform a function of reporting a subframe in which the RS or the BS cannot receive UL control information even if the UE transmits the UL control information.

The block subframe indicator can be transmitted by using a physical layer signal or a higher layer signal. When the block subframe indicator is transmitted by using the physical layer signal, it can be transmitted through a PDCCH, and advantageously can be directly delivered in a subframe reserved for transmission of the SR (hereinafter, referred to as an SR-reversed subframe). Of course, even if the block subframe indicator is transmitted by using the physical layer signal, not the SR-reserved subframe but an upcoming SR-reserved subframe can be indicated. When the block subframe indicator is transmitted by using the higher layer signal, there is an advantage in that a situation that occurs at a plurality of subframes later can be reported in advance to the relay UE without having to change the structure of the physical layer. In addition, information on a plurality of subframes can be advantageously delivered at one time. When the block subframe indicator is transmitted by using the higher layer signal, the block subframe indicator may indicate a specific subframe or a specific subframe set to report that it is the block subframe. The use of the higher layer signal is advantageous in the reporting of a collision occurrence possibility in advance with respect to the plurality of subframes.

The collision mode indicator and the block subframe indicator can be signaled independently from the reserved resource information or may be transmitted by being included in the reserved resource information.

The relay UE can use the reserved resource information to know a radio resource capable of UL control information transmission. In addition, the collision mode indicator and the block subframe indicator can be used to identify the block subframe. The relay UE judges whether a subframe for transmitting the UL control information overlaps with the block subframe (step S703). That is, it is judged whether collision occurs when transmitting the UL control information.

Regarding a subframe reserved for transmitting the UL control information, the relay UE may not transmit the UL control information if the subframe overlaps with the block subframe (step S704). The RS transmits backhaul UL data in the block subframe (step S705). The relay UE transmits the UL control information in a subframe that does not overlap with the block subframe among subframes reserved by the reserved resource information (step S706). The RS relays to the BS the UL control information received from the relay UE (step S707).

In a case where the UL control information is an SR, an SR transmission time may be delayed excessively if the block subframe and the SR-reserved subframe persistently overlap with each other. For example, backhaul UL transmission may have a repetitive configuration with a periodicity of 40 ms, and access UL transmission may also have a repetitive configuration with a periodicity of 40 ms. In such a repetitive configuration, the block subframe and the SR-reserved subframe may overlap N times (where N is a natural number greater than or equal to 2). Then, the wireless communication system may experience performance deterioration due to transmission delay of the SR. To solve this problem, when the block subframe and the SR-reserved subframe overlap with each other a specific number of times less than a predetermined threshold delay count N, SR transmission can be delayed, and when they overlap with each other afterwards, SR transmission can be performed.

In order to transmit the SR, a configuration of a backhaul link and/or an access link can be modified. For example, it is possible to modify a rule by which ACK/NACK for backhaul DL transmission must be performed 4 subframes later in HARQ applied in a backhaul link. There is a need for a method for avoiding collision between the SR and the previous unmodified ACK/NACK due to the modified SR transmission periodicity (or SR subframe offset). In this case, an additional SR resource can be reserved to be shared by UEs having the modified SR transmission periodicity or the resource can be additionally reserved.

A backhaul subframe allocation signal can be used to solve a blocking problem by the use of an SR transmission subframe pattern in association with the backhaul subframe allocation signal. This pattern is an SR transmission subframe pattern having a transmission periodicity of 10 ms or 40 ms in addition to the pervious SR transmission periodicity.

The modification of the subframe configuration rule applied to the backhaul link as described above can be allowed only when a specific block subframe and the SR-reserved subframe significantly overlap with each other. That is, a position of the block subframe can change by modifying the subframe configuration rule applied to the backhaul link only when UL data transmission is not achieved due to delay of SR transmission and such a situation has an effect on the wireless communication system.

Figure 8:
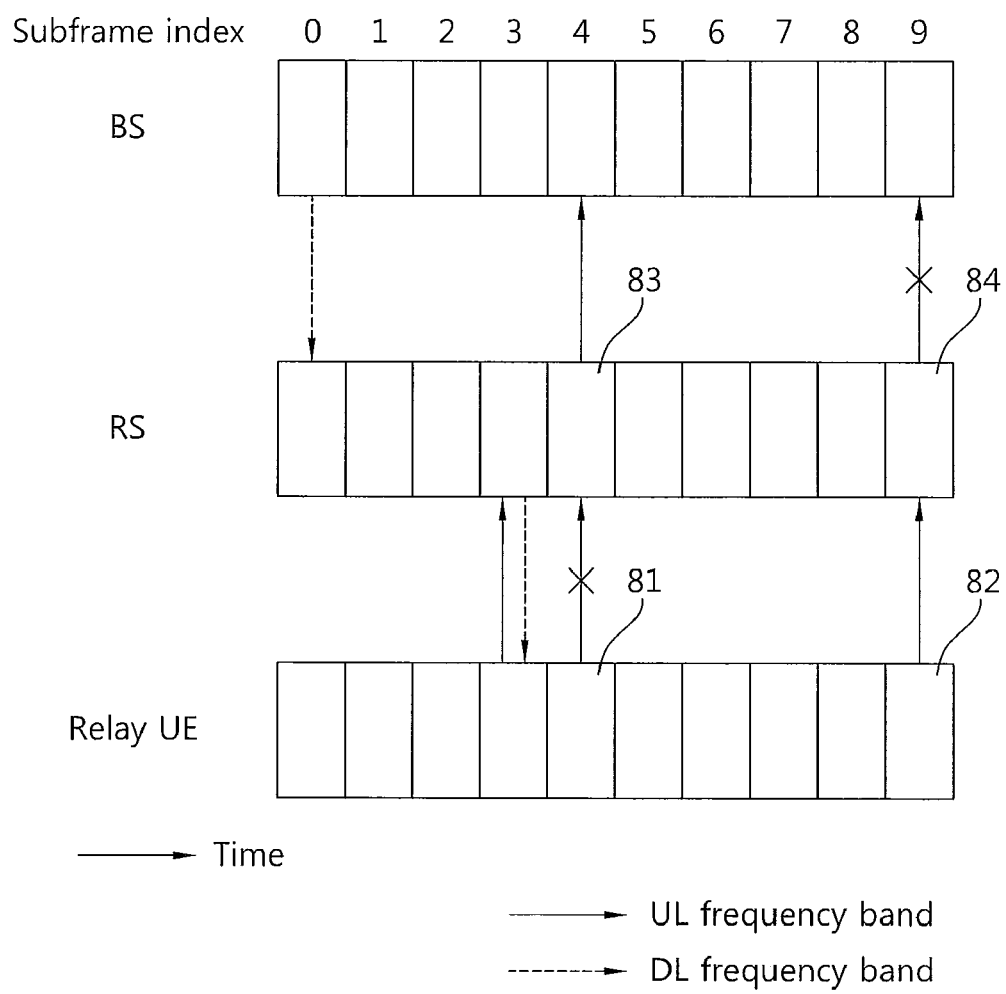
FIG. 8 shows an example of modifying a block subframe.

FIG. 8 shows an example of modifying a block subframe.

Referring to FIG. 8, a subframe #4 81 and a subframe #9 82 are SR-reserved subframes in a relay UE, and a subframe #4 83 and a subframe #9 84 are block subframes in an RS. The RS modifies the block subframe so that backhaul UL data is not transmitted in the subframe #9 84. Then, the relay UE can transmit an SR in the subframe #9 83 when the SR is not transmitted in the subframe #4 81.

Figure 9:
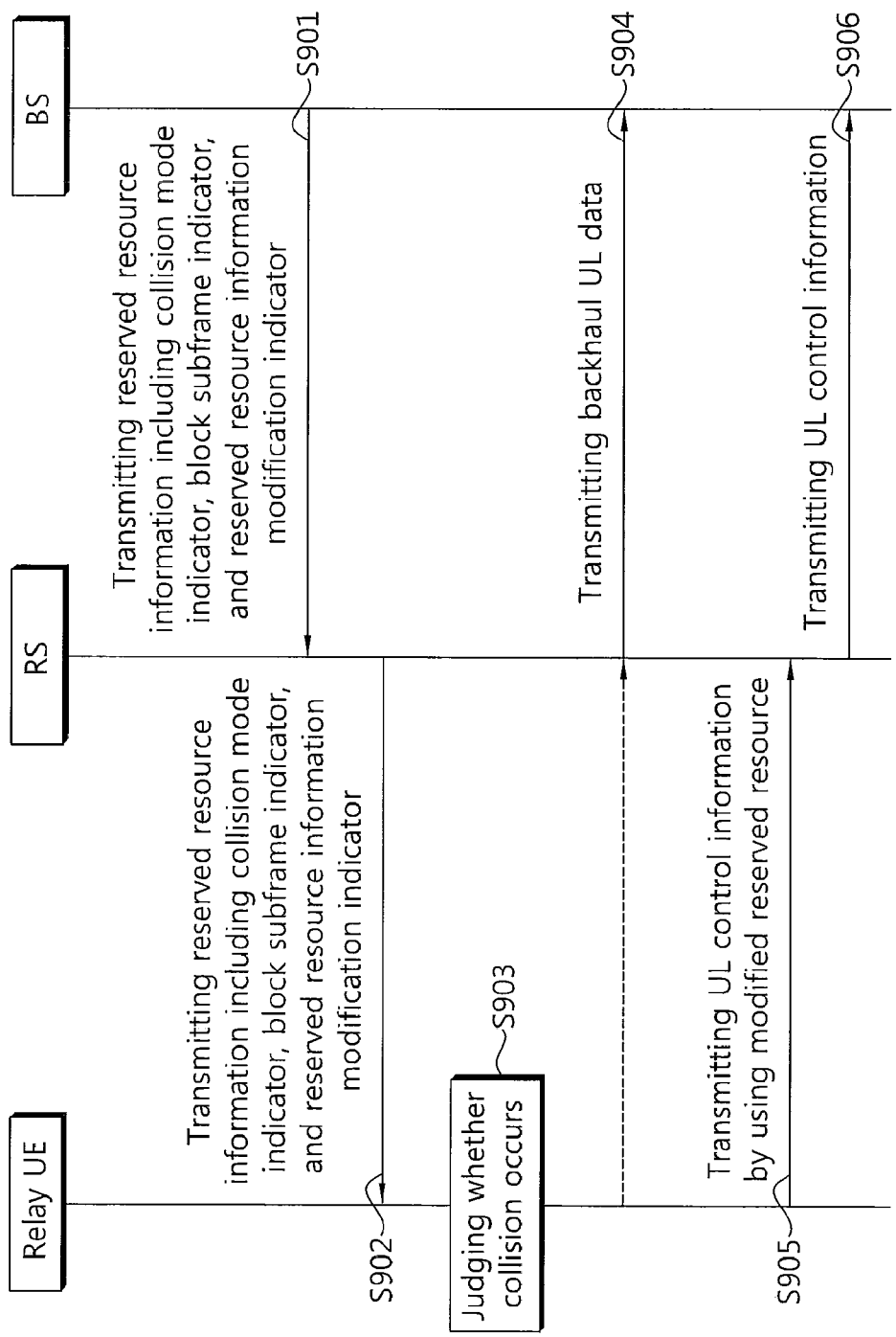
FIG. 9 is a flowchart showing a method of transmitting uplink control information according to another embodiment of the present invention.

FIG. 9 is a flowchart showing a method of transmitting UL control information according to another embodiment of the present invention.

Referring to FIG. 9, a BS transmits a collision mode indicator, a block subframe indicator, a reserved resource information modification indicator, and reserved resource information to an RS (step S901). The RS transmits the same information to a relay UE (step S902). Herein, the reserved resource information modification indicator implies information that modifies a radio resource reserved by using the reserved resource information. The reserved resource information modification indicator may be transmitted by using a physical layer signal or a higher layer signal. The reserved resource information modification indicator can be described below in greater detail.

The relay UE determines judges whether an SR-reserved subframe corresponds to a block subframe (step S903). In other words, it is determined whether collision occurs in the RS when an SR is transmitted in an SR-reserved subframe. If it is determined that the SR-reserved subframe overlaps with the block subframe, the relay UE transmits the SR through the modified reserved resource by using the reserved resource information modification indicator (step S905). In this case, the modified reserved resource may be included in a subframe which is different from SR-reserved subframes reserved by using the reserved resource information. The modified reserved resource will be described below. The RS transmits UL control information to the BS (step S906).

Figure 10:
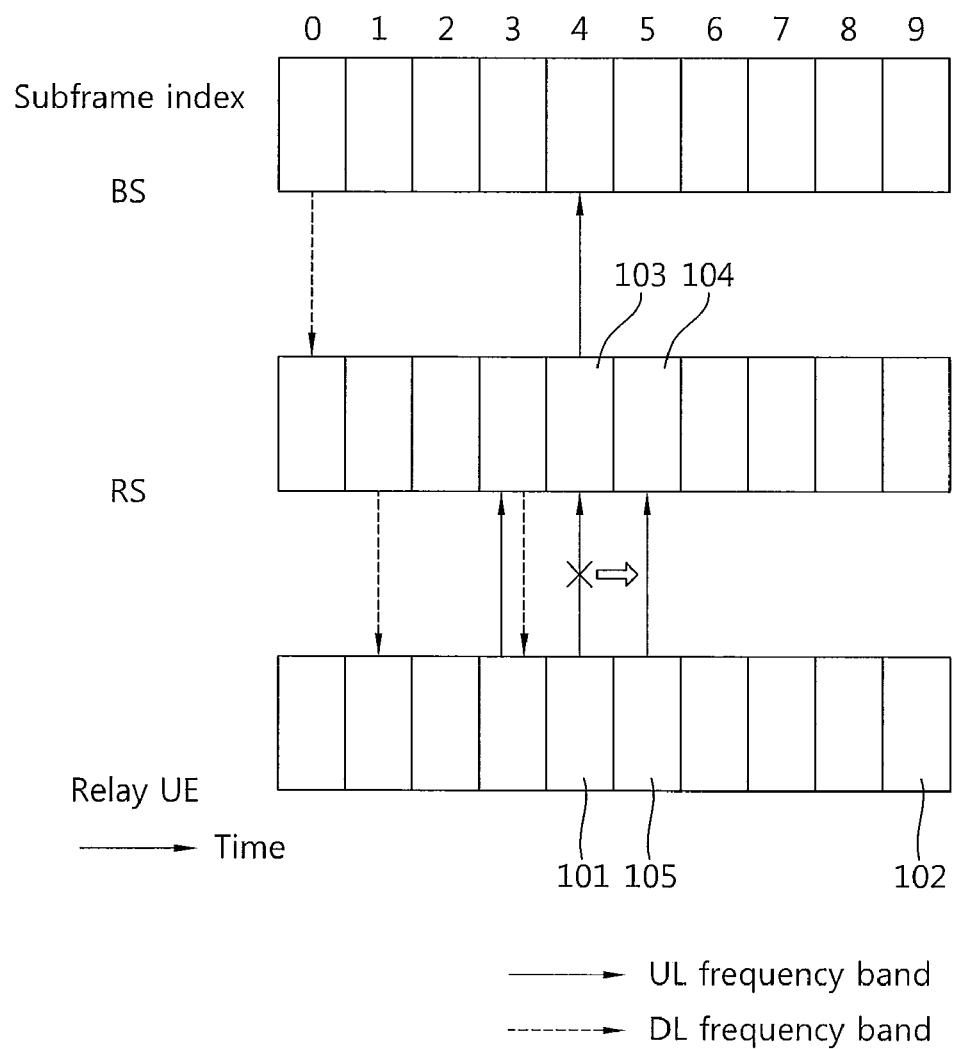
FIG. 10 shows an example of modifying a scheduling request (SR)-reserved subframe by using a reserved resource information modification indicator.

FIG. 10 shows an example of modifying an SR-reserved subframe by using a reserved resource information modification indicator.

In a relay UE, a subframe #4 101 and a subframe #9 102 are SR-reserved subframes reserved by using reserved resource information. If the relay UE transmits an SR in the subframe #4 101, an RS is unable to receive the SR due to backhaul UL transmission of the RS. In this case, the relay UE can transmit the SR in a subframe #5 105 which is a next upcoming subframe, rather than the subframe #9 102 which is an upcoming SR-reserved subframe.

A reserved resource information modification indicator can modify a radio resource reserved by the use of reserved resource information by indicating any one of a plurality of predetermined modification rules. For example, if an SR-reserved subframe overlaps with a block subframe, a modification rule for transmitting an SR in a subframe located in a very next position can be indicated. The aforementioned modification rule is for exemplary purposes only, and thus it is apparent that many other modification rules can also exist.

Alternatively, the reserved resource information modification indicator can modify the radio resource reserved by the use of the reserved resource information by indicating a modification value for information such as an SR periodicity, an SR subframe offset, etc.

Alternatively, the reserved resource information modification indicator can use a value dsr_TransMax transmitted by using a higher layer signal. As a reserved value, the value dsr_TransMax includes spare1, spare2, and spare3. A new definition can be made on the reserved value. For example, the reserved value can be defined such that the SR transmission periodicity is 1 ms or 2 ms. In case of the spare1, if an SR is triggered, a PUCCH resource is present, and there is no previously pending SR, then a value dsr_TransMax becomes 0, SR transmission is attempted one time, and then the SR transmission procedure ends. That is, the SR transmission is attempted only one time.

Alternatively, the spare1, the spare2, and the spare3 may have separate meanings. For example, a pattern of a subframe configuration that exists in a backhaul link can be designated and this pattern can be mapped such that the spare1, the spare2, and the spare3 are present. When backhaul UL transmission is performed from the RS to the BS in a subframe having an index which is a multiple of 8, the subframe is a block subframe. In this case, when a value of the spare1 is transmitted, the relay UE may not transmit the SR in a subframe having a subframe index which is a multiple of 8 in each radio frame. Although the backhaul UL transmission is performed in the subframe having an index corresponding to a multiple of 8 in the above example, the present invention is not limited thereto. For example, if backhaul UL transmission is performed in a specific pattern, for example, in subframes 1, 4, 7, 11, 14, and 17, the spare2 can be mapped to the backhaul UL transmission pattern.

Mapping between the reserved spare values of dsr_TransMax and the backhaul UL transmission pattern may be pre-defined or may vary. A plurality of backhaul UL transmission patterns can be pre-defined, and can be used by mapping to 3 spare values. Such mapping can be modified variously depending on a wireless communication system. A relation between the spare value and the backhaul UL transmission pattern can be reported to the relay UE by separately defining a higher layer signal or a physical layer signal. Alternatively, when the relay UE receives a specific signal, the pattern can be generated by using pre-defined equation.

Alternatively, a backhaul UL pattern can be found from a pre-defined table. The table can be determined by considering a backhaul subframe configuration. It is possible to operate one spare value to designate one pattern, and more patterns can be designated by combining a plurality of spare values. For example, 3 types of patterns can be identified by combining any two spare values among the spare1, the spare2, and the spare3, and one type of pattern can be additionally identified by combining all of the 3 spare values.

The SR transmission periodicity and the SR subframe offset table can be modified by considering a subframe configuration of a backhaul link. For example, a periodicity of 8 ms can be added to the SR transmission periodicity. If block subframe generated with 8 ms periodicity repetitively overlaps with the SR-reserved subframe, the BS can configure the periodicity of the SR-reserved subframe to 8 ms and provide an offset value so as to prevent overlapping with the block subframe. The periodicity of 8 ms may occur frequently if HARQ is performed in the backhaul link.

If information on the block subframe is not shared between the BS and the RS, the BS or the RS cannot transmit the block subframe indicator to the relay UE. Therefore, the relay UE transmits the SR irrespective of whether the RS transmits a signal in the SR-reserved subframe configured according to the reserved-resource information. When the relay UE receives NACK from the RS, the relay UE transmits the SR in an upcoming SR-reserved subframe. Such a method has an advantage in that the conventional UL control information transmission method is not necessarily modified between the BS and a macro UE. However, when the SR-reserved subframe repetitively overlaps with the block subframe, there may be a problem in that SR transmission is delayed.

To solve this problem, the BS can increase a priority for a specific UE in proportion to the number of times of overlapping occurrence between a subframe for receiving a signal from the RS and an SR-reserved subframe for the specific UE. If the priority for the specific UE is greater than a specific threshold, the BS changes a backhaul link subframe configuration with respect to the RS. That is, the backhaul UL transmission of the RS is limited in an upcoming SR-reserved subframe so that the specific UE can transmit the SR in the upcoming SR-reserved subframe and the RS can receive the SR.

In another embodiment, a reserved resource information modification indicator can be additionally transmitted to the relay UE in addition to the SR transmission periodicity and the SR subframe offset. For example, if the relay UE transmits an SR to the RS in a subframe 1 and fails to receive a UL grant or ACK, then the relay UE can transmit the SR in a subframe 6 which is an upcoming SR-reserved subframe. However, if the reserved resource information modification indicator is received, the relay UE can transmit the SR in a next upcoming subframe (e.g., a subframe 7) or N subframes later (e.g., a subframe 6+N), instead of the subframe 6. As such, the method of modifying the rule for the SR-reserved subframe is preferably applied to a UE that can understand the reserved resource information modification indicator (i.e., an LTE-A UE) rather than a legacy UE (e.g., an LTE UE).

In another embodiment, the RS can allocate a radio resource for SR reception but ignores an SR transmitted from the relay UE. It can be very natural operation since the RS is unable to receive the SR transmitted from the relay UE in a block subframe. However, the SR transmitted from the relay UE may have an effect on a neighboring cell as interference, and thus there is a need to consider a method for minimizing inter-cell interference.

The UL control information transmitted from the relay UE to the BS via the RS may be channel information such as CQI/PMI/RI. The aforementioned methods can be applied similarly also in a channel information feedback procedure. The channel information cannot be fed back when a subframe reserved for channel information transmission (hereinafter, a channel information-reserved subframe) overlaps with a block subframe for performing backhaul UL transmission.

The RS or the BS (via the RS) transmits reserved resource information regarding the channel information, a collision mode indicator, and a block subframe indicator to the relay UE. If the collision mode indicator indicates a collision enabled mode, the relay UE can refer to the block subframe indicator to know whether the channel information-reserved subframe will overlap with the block subframe. Therefore, the relay UE can transmit the channel information in a subframe other than the channel information-reserved subframe that overlaps with the block subframe.

The collision mode indicator and the block subframe indicator can be transmitted by using a physical layer signal or a higher layer signal. When the indicators are transmitted by using the physical layer signal, they can be transmitted through a DL control channel, e.g., a PDCCH of the channel information-reserved subframe. When the indicators are transmitted by using the higher layer signal, there is an advantage in that whether the block subframe overlaps with a plurality of channel information-reserved subframes can be reported in advance.

A legacy UE such as an LTE UE may not understand an additional signal such as the collision mode indicator and the block subframe indicator. The legacy UE may transmit channel feedback information in the block subframe and the RS may not allocate a received radio resource for the channel feedback information or even if the received radio resource is allocated, may ignore the radio resource.

The present invention can also be equally applied to a case where the relay UE transmits a sounding reference signal (SRS) used for UL scheduling of the BS. The SRS can be transmitted in a subframe designated with a specific period and offset (hereinafter, referred to as an SRS-reserved subframe). Radio resource information for SRS transmission is called SRS-reserved resource information.

The BS or the RS can transmit the collision mode indicator and the block subframe indicator to the relay UE in addition to the SRS-reserved resource information. When an SRS-reserved subframe designated by the SRS-reserved resource information overlaps with a block subframe designated by the block subframe indicator, the relay UE may not transmit the SRS in the SRS-reserved subframe. The block subframe indicator may perform an indicator function for a single frame, or may perform an indicator function for multiple subframes with one-time signaling. This is because, when the relay UE transmits the SRS in the SRS-reserved subframe overlapping with the block subframe, the RS cannot receive the SRS and it may act as interference to a UE of another neighboring cell.

The present invention is also applicable to a case where UL control information of the relay UE is HARQ ACK/NACK. If a specific subframe of the RS is a block subframe used for backhaul UL transmission, collision occurs in access UL transmission and thus ACK/NACK transmission of the relay UE becomes impossible. If the relay UE transmits the ACK/NACK but the RS fails to receive it, a radio resource is wasted and the wireless communication system experiences performance deterioration. To solve this problem, a method of repeating ACK/NACK transmission by considering the block subframe is proposed.

The section 10.2 of the 3GPP TS. 36.213 V8.5.0 (2008-12) can be incorporated herein to describe the conventional method of repeating ACK/NACK transmission. In case of frequency division duplex (FDD), a UE transmits ACK/NACK in a subframe n for a PDSCH received in a subframe n−4. If ACK/NACK repetition is enabled, the UE transmits the ACK/NACK in a PUCCH of subframes n, n+1, . . . , n+$N_{ANRep}$−1 with respect to the PDSCH received in the subframe n−4. In this case, ACK/NACK for a PDSCH received in subframes n−3, n+$N_{ANRep}$−5 is not transmitted.

In case of time division duplex (TDD), if ACK/NACK repetition is enabled, the UE transmits ACK/NACK in a UL subframe n with respect to a PDSCH received in a subframe(s) n−k. Herein, k denotes an element of K, where K is defined by Table 6 below.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

K is determined by a UL-DL configuration and a subframe n, and may consist of M elements such as {$k_0, k_1, \ldots, k_{M-1}$}. For example, if the UL-DL configuration is 0 and n is 7, then K is 6.

If the UE does not perform ACK/NACK repetition in a subframe n with respect to a PDSCH received in a DL subframe prior to the subframe n−k, then the UE transmits ACK/NACK only for the PDSCH received in the subframe n−k in a PUCCH of the UL subframe n and upcoming $N_{ANRep}$−1 UL subframes. Further, ACK/NACK for a PDSCH received in a subframe $n_i$−k is not transmitted. Herein, k denotes an element of $K_i$, where $K_i$ is defined in association with a subframe $n_i$ (where 1≤i≤$N_{ANRep}$−1) according to the above table.

In a subframe duration in which ACK/NACK transmission is repeated (hereinafter, an ACK/NACK repetition duration), all subframes or some subframes may overlap with block subframes. In this case, ACK/NACK is continuously transmitted in the ACK/NACK repetition duration according to the conventional ACK/NACK repetition. Although the RS is unable to receive the ACK/NACK, the relay UE transmits the ACK/NACK, which may act as interference to another UE.

According to an embodiment of the present invention, the relay UE receives the collision mode indicator and the block subframe indicator to know information on the block subframe. The relay UE does not transmit ACK/NACK in a subframe that overlaps with the block subframe, and thus can performs ACK/NACK repetition without ACK/NACK collision.

Figure 11:
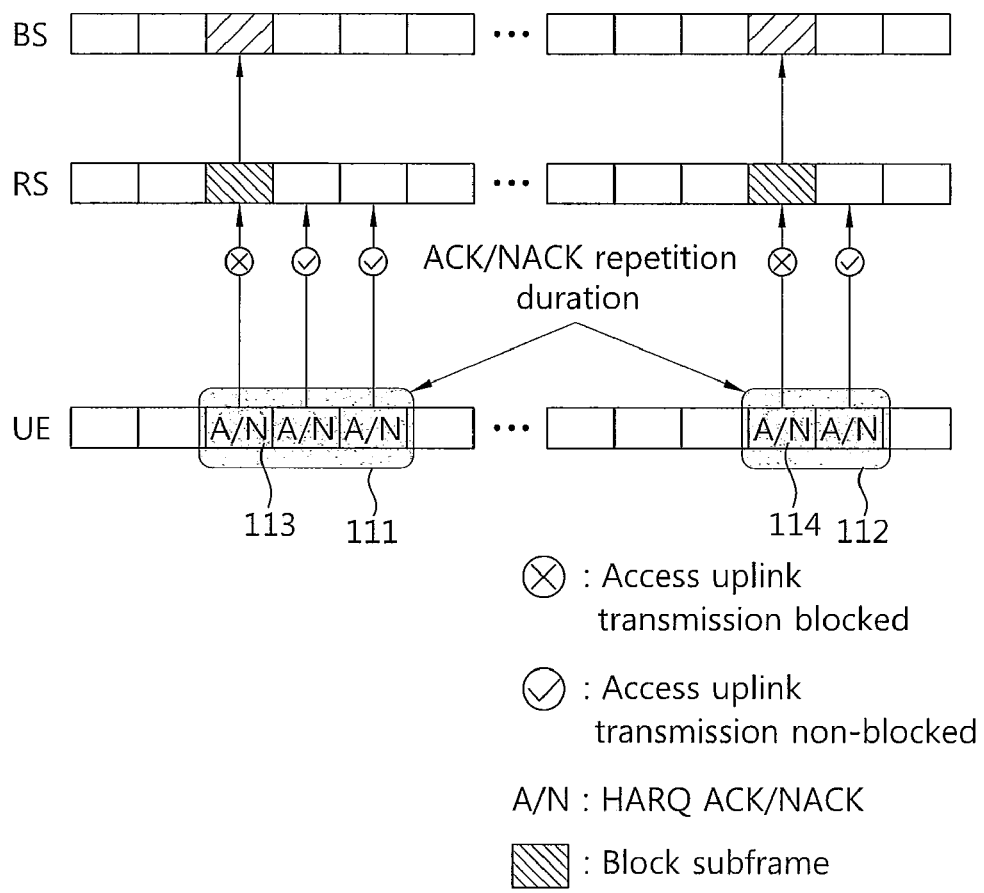
FIG. 11 to FIG. 13 show acknowledgement (ACK)/negative acknowledgement (NACK) repetition according to an embodiment of the present invention.
Figure 12:
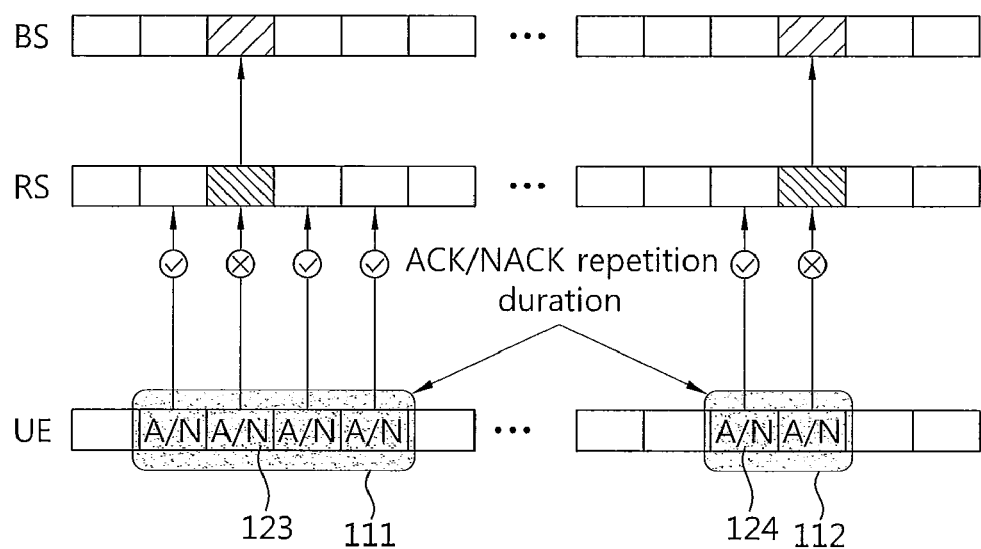
Figure 13:
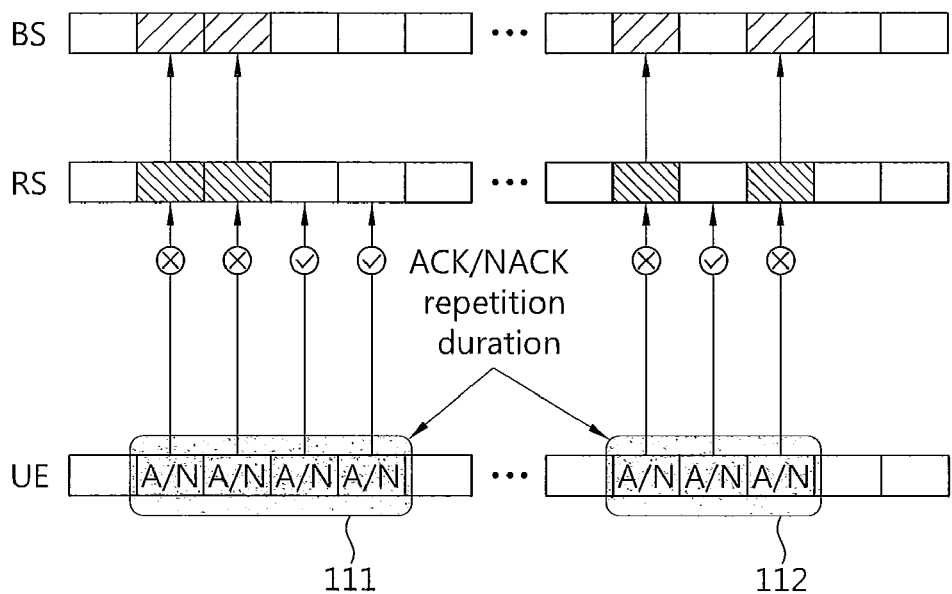

FIG. 11 to FIG. 13 show ACK/NACK repetition according to an embodiment of the present invention.

Referring to FIG. 11, if ACK/NACK repetition durations 111 and 112 are N subframes (where N is a natural number greater than or equal to 2), the ACK/NACK repetition durations 111 and 112 can be configured such that subframes 113 and 114 overlapping with a block subframe are located in a first position. Alternatively, referring to FIG. 12, subframes 123 and 124 overlapping with a block subframe can be configured such that they are located in a subframe other than a first subframe. Referring to FIG. 13, a plurality of subframes overlapping with a block subframe can be included in ACK/NACK repetition durations 111 and 112. As shown in the examples of FIG. 11 to FIG. 13, the ACK/NACK repetition durations 111 and 112 are configured such that at least one subframe not overlapping with the block subframe is included. Therefore, even if there is a subframe overlapping with the block subframe in the ACK/NACK repetition durations 111 and 112, an RS can receive ACK/NACK, and as a result, a BS can also receive the ACK/NACK. The ACK/NACK repetition duration and a block subframe indicator can be transmitted by using a higher layer signal or a physical layer signal.

A UE may (or may not) transmit the ACK/NACK in the block subframe included in the ACK/NACK repetition duration. The ACK/NACK is preferably not transmitted in a sense that the RS cannot receive the ACK/NACK in backhaul UL transmission and in a sense that it may act as interference to another UE or RS.

Figure 14:
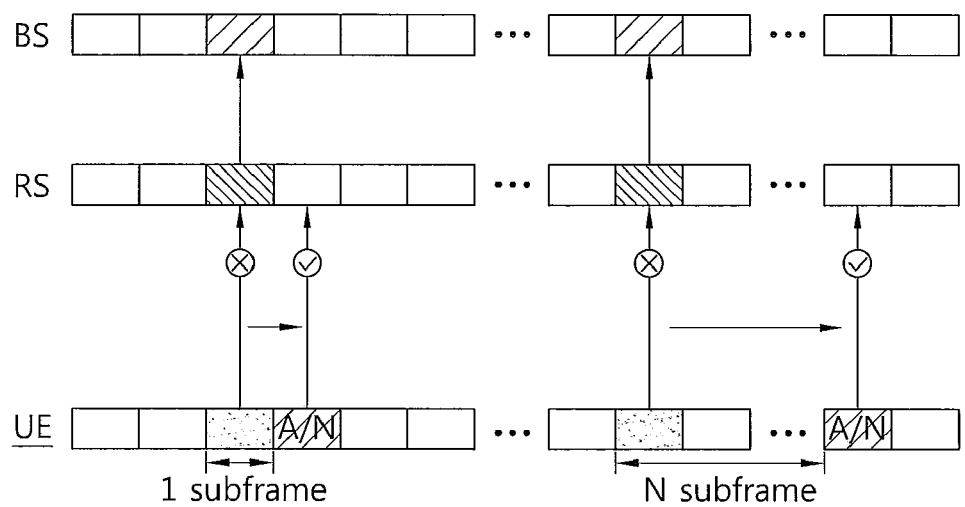
FIG. 14 shows ACK/NACK repetition according to another embodiment of the present invention.

FIG. 14 shows ACK/NACK repetition according to another embodiment of the present invention.

It is assumed that a relay UE knows information on a block subframe indicated by a block subframe indicator.

If a subframe for transmitting ACK/NACK overlaps with the block subframe, the relay UE can transmit ACK/NACK in an upcoming subframe or an $N_i^{th}$ subframe from that subframe (herein $N_i$ is an integer other than zero, and may be one or more values).

For example, if a subframe M overlaps with the block subframe, the relay UE can transmit ACK/NACK in a subframe $M+N_i$ (e.g., i=−1, 1). The ACK/NACK transmitted in the subframe $M+N_i$ can be transmitted as one signal by being combined with the ACK/NACK originally intended to be transmitted in the subframe $M_+N_i$ and ACK/NACK intended to be transmitted in the subframe M. They can be combined in various manners. The ACK/NACK originally intended to be transmitted in the subframe $M_+N_i$ may belong to the same UE or different UE.

In the aforementioned method, the value $N_i$ may be a negative value (i.e., $N_i$ may be any one of values −1, −2, and so on). For example, if the relay UE was intended to transmit the ACK/NACK in the subframe M but the subframe overlaps with the block subframe, the ACK/NACK can be transmitted in a subframe M−1, i.e., a subframe prior to the subframe M. Since the relay UE can know, in advance, information on the block subframe by using the block subframe indicator, the ACK/NACK can be transmitted in the subframe M−1.

The embodiment described with reference to FIG. 14 can be implemented by using the conventional ACK/NACK repetition signaling. When ACK/NACK repetition is enabled, the relay UE can perform ACK/NACK repetition based on the conventional method, or may operate according to the embodiment described with reference to FIG. 14. When the relay UE receives an ACK/NACK repetition enabling signal, the ACK/NACK repetition enabling signal can be interpreted such that ACK/NACK is transmitted in a shifted subframe such as the subframe M+N, instead of transmitting the ACK/NACK repetitively in the ACK/NACK repetition duration. This is applicable when the relay UE is an LTE-A UE, not a legacy UE.

Although a relation between the RS and the relay UE has been described in the embodiment described with reference to FIG. 11 to FIG. 14, the present invention is not limited thereto. Thus, the present invention is also applicable to a relation between the BS and the RS.

In the aforementioned embodiments described with reference to FIG. 11 to FIG. 14, the relay UE can perform any one of the following operations for a transmit (Tx) buffer.

1. The relay UE may flush the Tx buffer when a UL grant is received and a new data indicator (NDI) value is togged (i.e., from '0' to '1' or from '1' to '0').

2. The relay UE may flush the Tx buffer when the UL grant is received.

3. The relay UE may flush the Tx buffer only when ACK is received.

4. The relay UE may flush the Tx buffer only when the ACK is received and the NDI value is toggled.

5. The relay UE may flush the Tx buffer when the NDI value is toggled.

An aggressive scheduling method is an exemplary scheduling method of a BS. If UE transmits ACK/NACK with a high error rate and thereafter receives NACK or a signal implying no reception in the BS or a signal requesting retransmission, the UE retransmits the ACK/NACK. This method is called the aggressive scheduling method. The aggressive scheduling method does not require additional signaling and operations and can transmit UL control information even if a block subframe exists. However, the method may result in waste of ACK/NACK resources.

The ACK/NACK repetition according to an embodiment of the present invention can also be configured as follows. As described above, in case of the conventional FDD, when ACK/NACK repetition is enabled, the UE transmits ACK/NACK in a PUCCH of subframes n, n+1, . . . , n+($N_{ANRep}$−1) with respect to a PDSCH received in a subframe n−4. In this case, ACK/NACK for a PDSCH received in subframes n−3, . . . , n+($N_{ANRep}$−5) is not transmitted. According to the embodiment of the present invention, when the ACK/NACK repetition is enabled such that an ACK/NACK repetition duration corresponds to $N_{ANRep}$ subframes, the UE receives DL data through the PDSCH in the subframes n−3, . . . , n+($N_{ANRep}$−5). Further, ACK/NACK for the received DL data can be transmitted in a bundle type. That is, ACK/NACKs for DL data received in a plurality of subframes can be transmitted by being combined into one signal. The bundle-type ACK/NACK may be transmitted repetitively or the transmission may not be repeated. In doing so, retransmission of the DL data can be prevented by transmitting ACK/NACK for the DL data received in subframes n−3, . . . , n+($N_{ANRep}$−5). Therefore, DL data transmission can be prevented from unnecessary increase in its transmission amount.

Figure 15:
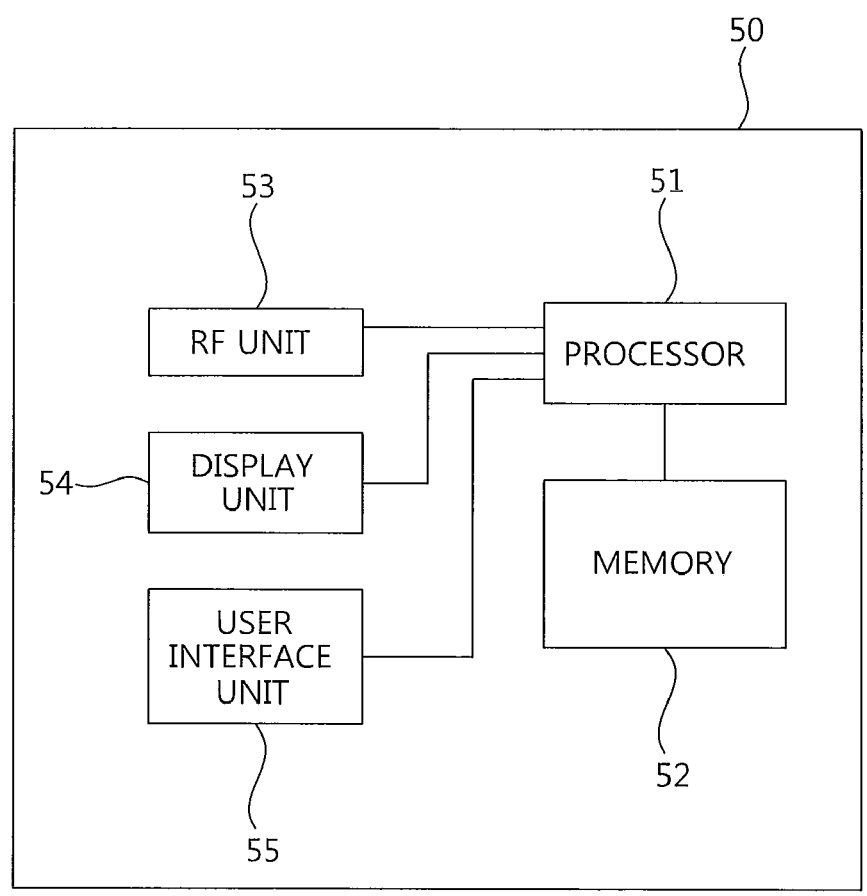
FIG. 15 is a block diagram showing a structure of a user equipment according to an embodiment of the present invention.

FIG. 15 is a block diagram showing a structure of a UE according to an embodiment of the present invention.

A UE 50 includes a processor 51, a memory 52, a radio frequency (RF) unit 53, a display unit 54, and a user interface 55. The RF unit 53 is coupled to the processor 51, and transmits and/or receives a radio signal. The memory 52 is coupled to the processor 51, and stores operating systems, applications, and general files. The display unit 54 displays a variety of information of a UE, and may use well-known elements such as liquid crystal display (LCD), organic light emitting diode (OLED), etc. The user interface unit 55 can be configured by combining well-known user interfaces such as a keypad, a touch screen, etc. The processor 51 receives a collision mode indicator, a block subframe indicator, reserved resource information, and a reserved resource information modification indicator, and determines a subframe in which an RS performs backhaul UL transmission based on the received information. Instead of transmitting UL control information in the block subframe, the UL control information can be transmitted according to the aforementioned method.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting uplink control information of a user equipment in a wireless communication system, the method comprising:
   receiving reserved resource information that indicates a plurality of transmission-reserved subframes, each of the transmission-reserved subframes being periodically configured to transmit uplink control information;
   receiving a block subframe indicator that indicates a block subframe for transmitting a signal from a relay station to a base station;
   comparing the plurality of transmission-reserved subframes indicated by the reserved resource information with the block subframe indicated by the block subframe indicator;
   selecting a transmission-reserved subframe which does not coincide with the block subframe among the plurality of transmission-reserved subframes; and
   transmitting the uplink control information in the selected transmission-reserved subframe.

2. The method of claim 1, further comprising receiving a collision mode indicator, wherein the collision mode indicator indicates any one of a collision-enabled mode for allowing overlapping between the transmission-reserved subframe and the block subframe and a collision-disabled mode for not allowing overlapping between the transmission-reserved subframe and the block subframe.

3. The method of claim 2, wherein the receiving of the block subframe indicator and the comparing of the plurality of transmission-reserved subframes are performed only when the collision mode indicator indicates the collision-enabled mode.

4. The method of claim 1, wherein the reserved resource information includes information on a transmission periodicity for the plurality of transmission-reserved subframes and a subframe offset value.

5. The method of claim 4, further comprising receiving a reserved resource information modification indicator that modifies the reserved resource information, wherein the reserved resource information modification indicator modifies at least one of the transmission periodicity and the subframe offset value.

6. The method of claim 1, wherein the reserved resource information is transmitted by using a signal of a layer higher than a physical layer.

7. The method of claim 1, wherein the block subframe indicator is transmitted by using a physical layer signal or a signal of a layer higher than a physical layer.

8. The method of claim 7, wherein if the block subframe indicator is transmitted by using the physical layer signal, the block subframe indicator is transmitted through a physical downlink control channel (PDCCH) included in the transmission-reserved subframe.

9. The method of claim 1, wherein if the uplink control information is a hybrid automatic repeat request (HARQ) acknowledgement (ACK)/negative acknowledgement (NACK), the reserved resource information includes an ACK/NACK repetition indicator that indicates whether HARQ ACK/NACK transmission is repeated in consecutive subframes and information that indicates an HARQ ACK/NACK repetition duration.

10. The method of claim 9, wherein if the ACK/NACK repetition indicator indicates ACK/NACK repetition, the ACK/NACK is transmitted in the selected transmission-reserved subframe.

11. The method of claim 1, wherein the uplink control information includes at least one of a scheduling request, channel feedback information for feeding back a channel state, a sounding reference signal, and an HARQ ACK/NACK.

12. An apparatus comprising:
   a radio frequency (RF) unit for transmitting and receiving a radio signal; and
   a processor coupled to the RF, unit and configured to:
      receive reserved resource information that indicates a plurality of transmission-reserved subframes, each of the transmission-reserved subframes being periodically configured to transmit uplink control information,
      receive a block subframe indicator that indicates a block subframe for transmitting a signal from a relay station to a base station,
      compare the plurality of transmission-reserved subframes indicated by the reserved resource information with the block subframe indicated by the block subframe indicator,
      transmit the uplink control information in a selected transmission-reserved subframe among the plurality of transmission-reserved subframes, and
      select a transmission-reserved subframe which does not coincide with the block subframe among the plurality of transmission-reserved subframes,
   wherein the selected transmission-reserved subframe is a subframe which does not overlap with the block subframe.

* * * * *